United States Patent [19]
Togawa

[11] Patent Number: 6,110,024
[45] Date of Patent: Aug. 29, 2000

[54] POLISHING APPARATUS

[75] Inventor: Tetsuji Togawa, Chigasaki, Japan

[73] Assignee: Ebara Corporation, Tokyo, Japan

[21] Appl. No.: 08/923,543

[22] Filed: Sep. 4, 1997

[30] Foreign Application Priority Data

Sep. 4, 1996 [JP] Japan .................................. 8-253850

[51] Int. Cl.$^7$ ...................................................... B24B 5/00
[52] U.S. Cl. .......................... 451/285; 451/288; 451/289; 451/388; 384/484
[58] Field of Search .............................. 451/41, 285, 287, 451/288, 54, 289, 388, 397, 403; 429/78; 384/478, 479, 482, 484, 485, 489

[56] References Cited

U.S. PATENT DOCUMENTS

| | | |
|---|---|---|
| 4,659,279 | 4/1987 | Akeel et al. . |
| 4,662,119 | 5/1987 | Kojima ........................................ 451/66 |
| 4,858,975 | 8/1989 | Ogawa . |
| 4,984,745 | 1/1991 | Akeel et al. . |
| 5,513,946 | 5/1996 | Sawada et al. . |
| 5,839,947 | 11/1998 | Kimura et al. ............................ 451/288 |
| 5,893,794 | 4/1999 | Togawa et al. ............................ 451/67 |

FOREIGN PATENT DOCUMENTS

| | | |
|---|---|---|
| 0 289 622 | 11/1988 | European Pat. Off. . |
| 0 648 575 | 4/1995 | European Pat. Off. . |
| 96/17713 | 6/1996 | WIPO . |

OTHER PUBLICATIONS

Pending U.S. Application Serial No. 08/923412, filed Sep. 4, 1997, Tetsuji Togawa et al., entitled "Workpiece Transfer Robot", located in Group Art Unit 3652.
Patent Abstracts of Japan, 01274945, Nov. 2, 1989.
Patent Abstracts of Japan, 07130691, May 19, 1995.
Patent Abstracts of Japan, 06005568, Jan. 14, 1994.

Primary Examiner—Eileen P. Morgan
Attorney, Agent, or Firm—Wenderoth, Lind & Ponack, L.L.P.

[57] ABSTRACT

A polishing apparatus for polishing a workpiece such as a semiconductor wafer includes a polishing section for polishing a surface of the workpiece held by the top ring, and a cleaning section for cleaning the workpiece which has been polished in the polishing section. The polishing apparatus further includes a workpiece transfer robot for transferring the workpiece to be polished to the polishing section or the workpiece which has been polished in the cleaning section. The workpiece transfer robot has a robot body, at least one arm operatively coupled to the robot body by at least one joint, a holder mechanism mounted on the arm for holding a workpiece, and a sealing mechanism provided at the joint for preventing liquid from entering an interior of the joint.

8 Claims, 5 Drawing Sheets

POLISHING APPARATUS

BACKGROUND OF THE INVENTION

1. Field of the Invention

The present invention relates to a polishing apparatus for polishing a workpiece such as a semiconductor wafer to a flat mirror finish, and more particularly to a polishing apparatus having a workpiece transfer robot for transferring a workpiece from one operation to the next.

2. Description of the Related Art

Recent rapid progress in semiconductor device integration demands smaller and smaller wiring patterns or interconnections and also narrower spaces between interconnections which connect active areas. One of the processes available for forming such interconnections is photolithography. Though the photolithographic process can form interconnections that are at most 0.5 $\mu$m wide, it requires that surfaces on which pattern images are to be focused by a stepper be as flat as possible because the depth of focus of the optical system is relatively small.

It is therefore necessary to make the surfaces of semiconductor wafers flat for photolithography. One customary way of flattening the surfaces of semiconductor wafers is to polish them with a polishing apparatus, and such a process is called Chemical Mechanical polishing.

Conventionally, a polishing apparatus has a turntable and a top ring which rotate at respective individual speeds. A polishing cloth is attached to the upper surface of the turntable. A semiconductor wafer to be polished is placed on the polishing cloth and clamped between the top ring and the turntable. An abrasive liquid containing abrasive grains is supplied onto the polishing cloth and retained on the polishing cloth. During operation, the top ring exerts a certain pressure on the turntable, and the surface of the semiconductor wafer held against the polishing cloth is therefore polished by a combination of chemical polishing and mechanical polishing to a flat mirror finish while the top ring an the turntable are rotated.

The semiconductor wafer which has be polished carries abrasive liquid and ground-off particles attached thereto. Therefore, the polished semiconductor wafer has to be cleaned to remove the foreign matter including abrasive liquid and ground-off particles therefrom by cleaning devices incorporated in the polishing apparatus.

It has been customary to install a workpiece transfer robot to transfer a semiconductor wafer in the polishing apparatus.

FIG. 8 shows a conventional workpiece transfer robot installed in a polishing apparatus. As shown in FIG. 8, a workpiece transfer robot 1 comprises a substantially cylindrical robot body 10, and a pair of arm mechanisms 21 mounted on an upper surface of the robot body 10. Each of the arm mechanisms 21 comprises two articulated arms 25, 27. The arm 25 is operatively connected to the robot body 10 by a joint 35 and the arm 27 is operatively connected to the arm 25 by a joint 37. Hand attachments 33 are operatively connected to the respective arms 27 by joints 38. Hands (not shown in FIG. 8) for holding semiconductor wafers are mounted respectively on the hand attachments 33.

After the semiconductor wafer is polished, abrasive liquid and ground-off particles are attached to the semiconductor wafer. Therefore, the polished semiconductor wafer is transferred to the cleaning device by the workpiece transfer robot 1 and cleaned by the cleaning device. After the polished semiconductor is cleaned, liquid is attached to the semiconductor wafer because cleaning liquid or pure water is applied to the semiconductor wafer. Therefore, when the arm mechanisms 21 are actuated, the cleaning liquid or pure water tends to drop from the semiconductor wafer and the hands, and stays on the robot body 10 and the arms 25, 27.

The liquid tends to be gradually deposited around the joints 35 in greater quantities as shown by hatching parts 39 in FIG. 8, and the liquid enters through gaps in the joints 35 into the interiors of the robot body 10 and the arms 25, thus causing corrosion to internal mechanisms of the workpiece transfer robot 1.

The workpiece transfer robot 1 which has a vacuum chuck includes a vacuum path extending from the interior of the robot body 10 through the interiors of the arms 25, 27 and the interiors of the joints 35, 37, 38 to the vacuum chuck mechanism.

If leakage occurs in the vacuum path in the arm 25, then vacuum will be developed in the arm 25. Even if the joint 35 is sealed, the joint 35 may suffer a seal failure, which results in a leakage for the vacuum developed in the arm 25. Accordingly, the liquids 39 such as water around the joint 35 may be drawn into the interior of the joint 35 under suction caused by the leakage, and may cause corrosive damage to the interiors of the arm 25 and the robot body 10. The same problem occurs at the joints 37, 38.

One solution would be to develop an internal pressure higher than the atmospheric pressure in the arm 25 for driving the water 39 out from the arm 25. However, such a high internal pressure is liable to eject other foreign matter as well as the drawn water 39 out of the arm 25, thus contaminating the exterior of the arm 25, the polished and cleaned semiconductor wafers, and other units such as the cleaning devices.

SUMMARY OF THE INVENTION

It is therefore an object of the present invention to provide a polishing apparatus having a workpiece transfer robot which prevents external liquid from entering the interior of the robot, imposes relatively small resistance to sliding motion, and is relatively simple in structure.

According to the first aspect of the present invention, there is provided a polishing apparatus comprising: a polishing section having a top ring for holding a workpiece to be polished and a turntable having a polishing surface for polishing a surface of the workpiece held by the top ring; a cleaning section having a cleaning device for cleaning the workpiece which has been polished in the polishing section; and a workpiece transfer robot for transferring the workpiece to be polished to the polishing section or the workpiece which has been polished in the cleaning section; the workpiece transfer robot comprising: a robot body; at least one arm operatively coupled to the robot body by at least one joint; a holder mechanism mounted on the arm for holding a workpiece; and a sealing mechanism provided at the joint for preventing liquid from entering an interior of the joint.

According to the second aspect of the present invention, there is provided a polishing apparatus comprising: a polishing section having a top ring for holding a workpiece to be polished and a turntable having a polishing surface for polishing a surface of the workpiece held by the top ring; a cleaning section having a cleaning device for cleaning the workpiece which has been polished in the polishing section; and a workpiece transfer robot for transferring the workpiece to be polished to the polishing section or the workpiece which has been polished in the cleaning section; the workpiece transfer robot comprising: a robot body; at least one arm operatively coupled to the robot body by at least one joint; a holder mechanism mounted on the arm for holding a workpiece; and a seal mechanism provided at the joint for preventing liquid from entering an interior of the joint, sealing area of the seal mechanism being provided at a position higher than the highest surface level of liquid deposited on an upper surface of one of the robot body and the arm.

According to the third aspect of the present invention, there is provided a polishing apparatus comprising: a polishing section having a top ring for holding workpiece to be polished and a turntable having a polishing surface for polishing a surface of the workpiece held by the top ring; a cleaning section having a cleaning device for cleaning the workpiece which has been polished in the polishing section; and a workpiece transfer robot for transferring the workpiece to be polished to the polishing section or the workpiece which has been polished in the cleaning section; the workpiece transfer robot comprising: a robot body; at least One arm operatively coupled to the robot body by at least one joint; a vacuum chuck mechanism mounted on the arm for holding: a workpiece under vacuum; a vacuum path extending from the robot body through the joint and the arm to the vacuum chuck mechanism; a seal mechanism provided at the joint for preventing liquid from entering an interior of the joint; and a vent hole provided in the arm for substantially equalizing a pressure in the arm to a pressure outside of the arm.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENTS

Next, a polishing apparatus according to embodiments of the present invention will be described below with reference to drawings.

Figure 1:
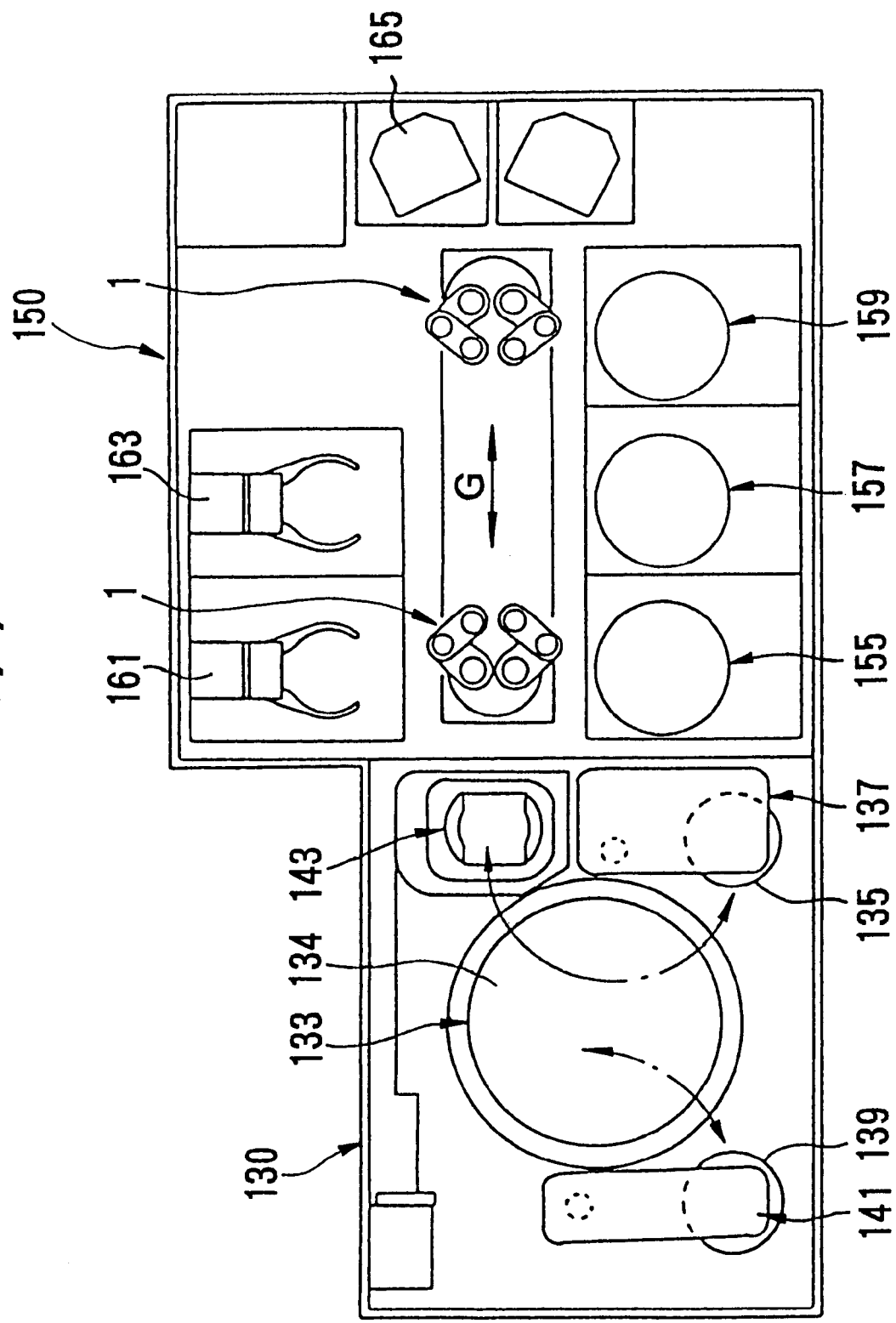
FIG. 1 is a schematic plan view of a polishing apparatus.

As shown in FIG. 1 of the accompanying drawings, a polishing apparatus comprises a polishing section 130 and a cleaning section 150.

The polishing section 130 comprises a central turntable 133 having a polishing surface 134 thereon, a top ring unit 137 disposed on one side of the turntable 133 and having a top ring 135, a dressing unit 141 disposed on the other side of the turntable 133 and having a dressing tool 139, and a workpiece transfer unit 143 positioned laterally of the top ring unit 137. The polishing surface 134 comprises a polishing cloth.

The cleaning section 150 comprises two central workpiece transfer robots 1 movable in the directions indicated by the arrow G, primary and secondary cleaning devices 155, 157 and a spinning drier (or a drier combined with a cleaning device) 159 which are juxtaposed on one side of the workpiece transfer robots 1, and two workpiece reversing units 161, 163 which are juxtaposed on the other side of the workpiece transfer robots 1.

When workpiece cassettes 165 containing a plurality of semiconductor wafers to be polished are et in the position shown in FIG. 1, the right-hand workpiece transfer robot 1 takes out a semiconductor wafer from one of the workpiece cassettes 165, and transfers the semiconductor wafer to the workpiece reversing unit 163. The semiconductor wafer is reversed, i.e. turned upside down, by the workpiece reversing unit 163. The reversed semiconductor wafer is then transferred from the workpiece reversing unit 163 to the workpieces transfer unit 143 in the polishing section 130 by the left-hand workpiece transfer robot 1.

The semiconductor wafer placed on the workpiece transfer unit 143 is transferred to and held on a lower surface of the top ring 135 of the top ring unit 137 which is angularly movable as indicated by the dot-and-dash-line arrow, and is moved onto the turntable 133. The semiconductor wafer is now polished by the polishing surface 134 of the turntable 133 which is rotated.

After the semiconductor wafer is polished, the top ring 135 is moved toward the workpiece transfer unit 143, and returns the polished semiconductor wafer to the workpiece transfer unit 143. The semiconductor wafer is then transferred from the workpiece transfer unit 143 to the workpiece reversing unit 161 by the left-hand workpiece transfer robot 1. The workpiece reversing unit 161 reverses the semiconductor wafer upside down while the semiconductor wafer is being cleaned with pure water. The semiconductor wafer is then cleaned by the primary and secondary cleaning devices 155, 157, and is spin-dried by the spinning drier 159. The cleaned and dried semiconductor wafer is finally returned to the cassette 165 by the right-hand workpiece transfer robot 1.

After the semiconductor wafer is polished and removed from the turntable 133, the dressing unit 141 is angularly moved over the turntable 133 as indicated by the dot-and-dash-line arrow, and then presses the rotating dressing toll 139 against the polishing surface 134 of the rotating turntable 133 for thereby dressing and regenerating the polishing surface 134.

Figure 2:
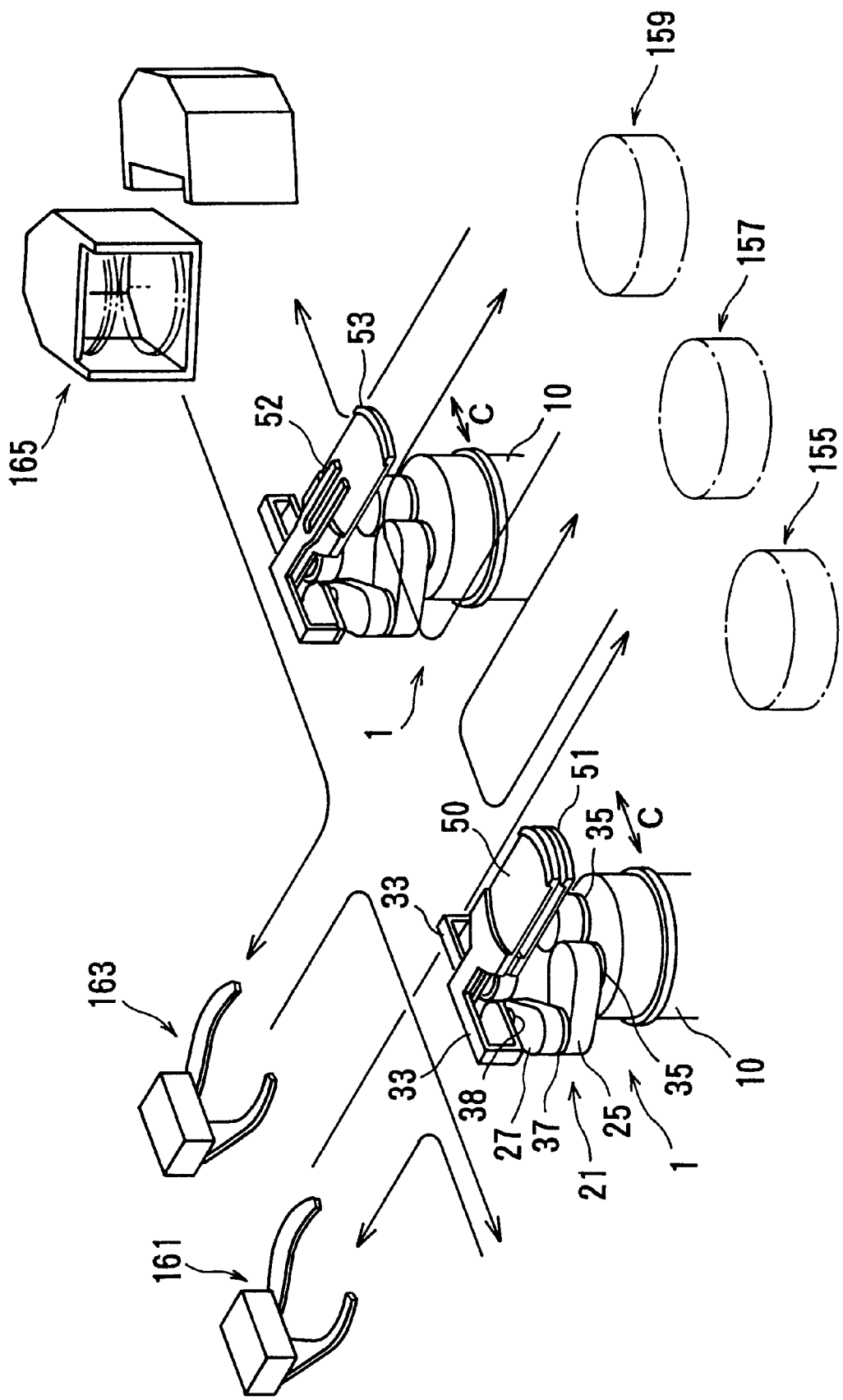
FIG. 2 is a schematic perspective view showing the manner in which workpiece transfer robots in a cleaning section of the polishing apparatus shown in FIG. 1 operate.

FIG. 2 of the accompanying drawings shows the manner in which the workpiece transfer robots 1 operate.

As shown in FIG. 2, each of the workpiece transfer robots 1 comprises a substantially cylindrical robot body 10 and a pair of arm mechanisms 21 mounted on an Upper surface of the robot body 10.

Each of the arm mechanisms 21 comprises two articulated arms 25, 27. The arm 25 is operatively connected to the robot body 10 by a joint 35 and the arm 27 operatively connected to the arm 25 by a joint 37. A pair of hand attachments 33 is operatively connected to the respective arms 27 by joints 38. As shown in FIG. 2, hands 50, 51 for holding semiconductor wafers are mounted respectively on tip ends of the hand attachments 33 in the left-hand workpiece transfer robot 1. The hands 50, 51 are positioned in vertically superposed relation to each other. The workpiece transfer robots 1 are similar in structure to each other, except that the right-hand workpiece transfer robot 1 shown in FIG. 2 has vertically superposed hands 52, 53 instead of the hands 50, 51.

The hands 50, 51, 53 are of the type which support semiconductor wafers placed on their surfaces, and the hand 52 is of the type which has a vacuum chuck mechanism for holding a semiconductor wafer under vacuum. In some cases, the hand 50 may have a vacuum chuck mechanism.

Operation of the workpiece transfer,, robots 1 will be described in detail below with reference to FIG. 2. A semiconductor wafer is transferred from one of the cassettes 165 to the workpiece reversing unit 163 by the hand 52 of the right-hand workpiece transfer robot 1. The reversed semiconductor wafer is transferred from the workpiece reversing unit 163 to the workpiece transfer unit 143 (see FIG. 1) by the hand 50 of the left-hand workpiece transfer robot 1. The polished semiconductor wafer is transferred from the workpiece transfer unit 143 to the workpiece reversing unit 161 by the hand 51 of the left-hand workpiece transfer robot 1. The reversed semiconductor wafer is then transferred from the workpiece reversing unit 161 to the primary cleaning device 155 by the hand 51. The primarily cleaned semiconductor wafer is transferred from the primary cleaning device 155 to the secondary cleaning device 157 by the hand 50. The secondarily cleaned semiconductor wafer is transferred from the secondary cleaning device 157 to the spinning drier 19 by the hand 53 of the right-hand workpiece transfer robot 1. The semiconductor wafer is then transferred from the spinning drier 159 to the cassette 165 by the hand 52 of the right-hand workpiece transfer robot 1.

Figure 3:
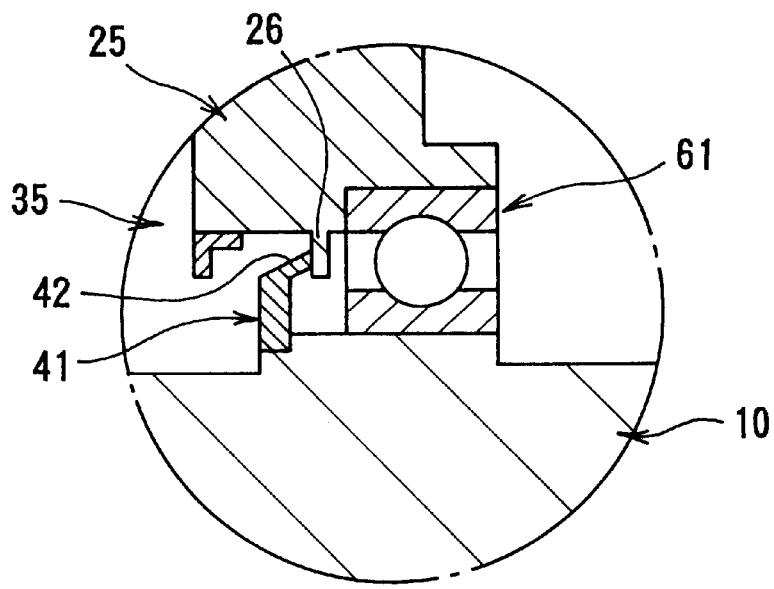
FIG. 3 is an enlarged fragmentary cross sectional view of a joint of a workpiece transfer robot according to a first embodiment of the present invention.
Figure 8:
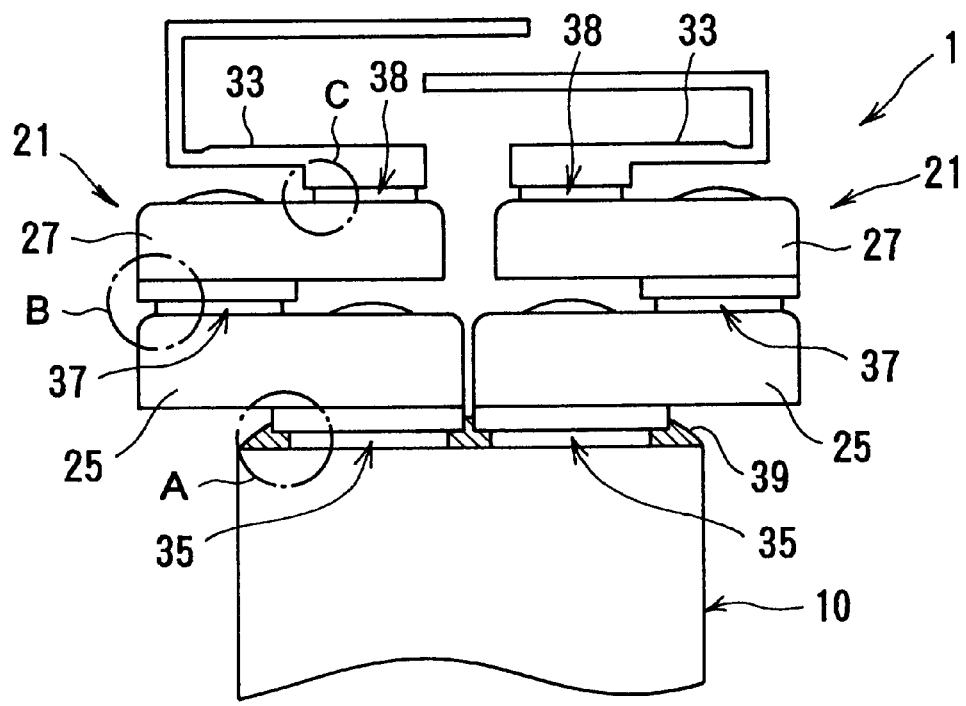
FIG. 8 is a fragmentary side elevational view of a conventional workpiece transfer robot incorporated in the polishing apparatus.

FIG. 3 shows a joint 35 of the workpiece transfer robot 1 shown in FIGS. 1 and 2 which incorporates a liquid-tight mechanism according to a first embodiment of the present invention. The joint 35 shown in FIG. 3 corresponds to an encircled portion A in FIG. 8. Those parts shown in FIG. 3 which are identical to those shown in FIGS. 2 and 8 are denoted by identical reference numerals, and will not be described in detail below.

As shown in FIG. 3, the joint 35 includes a bearing mechanism 61 disposed between the robot body 10 and the arm 25 for supporting the arm 25 rotatably on the robot body 10. An actuator mechanism (not shown) extends in the bearing mechanism 61 for transmitting driving forces from the robot body 10 to the arm 25 for angularly moving the arm 25 with respect to the robot body 10.

According to the first embodiment, an oilless sliding dry seal 41 is disposed around the bearing mechanism 61 and mounted on the robot body 10.

The oilless sliding dry seal 41 comprises a ring member made of synthetic resin such as fluorocarbon resin which suffers relatively small wear and has relatively low sliding friction. The oilless sliding dry seal 41 has an axial upper end which is tapered to form an annular sliding lip 42 having a smaller inner diameter. The oilless sliding dry seal 41 has an axial lower end fixed to an upper surface of the robot body 10. The arm 25 has an annular sliding ridge 26 extending downwardly therefrom and arranged radially inwardly of the oilless sliding dry seal 41.

The annular sliding lip 42 has a tip end held in intimate sliding contact with an outer circumferential surface of the annular sliding ridge 26, thereby providing a secure seal between the annular sliding lip 42 and the annular sliding ridge 26. That is, a full-circumferential surface of the joint 35 is sealed by an intimate contact between the annular sliding lip 42 and the annular sliding ridge 26. Since the oilless sliding dry seal 41 is made of fluorocarbon resin, it has a smaller sliding resistance compared with an O-ring.

The oilless sliding dry seal 41 may be incorporated in each of encircled portions B, C of the joints 37, 38 (see FIG. 8).

With the above arrangement, when the water 39 (shown by hatching parts in FIG. 8) is gradually deposited around the joint 35 in greater quantities, it tends to enter through the joint 35 into the interiors of the robot body 10 and the arm 25. However, the water 39 is prevented from entering the interior of the joint 35 by the annular sliding lip 42 and the annular sliding ridge 26 which are closely held in sliding contact with each other. Thus, internal mechanisms of the workpiece transfer robot 1 and the interior of the arm 25 are protected from corrosion.

Since the oilless sliding dry seal 41 has a smaller sliding resistance compared with an O-ring, an electric motor for actuating the arm mechanisms 21 (see FIG. 8) may be of smaller output power requirements. Thus, the electric motor may be an energy saver, less costly, and small in size.

The oilless sliding dry seal 41 may be installed in only those joints positioned at areas where water is more likely to be deposited.

The oilless sliding dry seal 41 may be fixed to the arm 25, and the annular sliding ridge 26 may be provided mounted on the robot body 10.

The oilless sliding dry seal 41 may be made of any other synthetic resin than fluorocarbon resin insofar as it suffers relatively small wear and has relatively log sliding friction.

The oilless sliding dry seal 41 may be applicable to various types of workpiece transfer robots other than the workpiece transfer robot with the vacuum chuck.

Even though an O-ring is used in the robot in place of the oilless sliding dry seal, if fluorocarbon resin coating is applied to the surface of the O-ring, then the sliding resistance can be reduced, and hence the same effect can be obtained. Further, by changing material of the O-ring from rubber to material having a low sliding resistance such as fluorocarbon resin, the same effect can be obtained.

In the first embodiment, since the oilless sliding dry seal 41 and the annular sliding ridge 26 are held in mechanical contact with each other, if vacuum is developed in the arm 25 due to a leakage from a vacuum path in the workpiece transfer robot, then the water 39 may possibly enter through the seal between the oilless sliding dry seal 41 and the annular sliding ridge 26 into the interior of the joint 5 due to a large pressure difference between the atmospheric pressure and the pressure in the arm 25.

Figure 4:
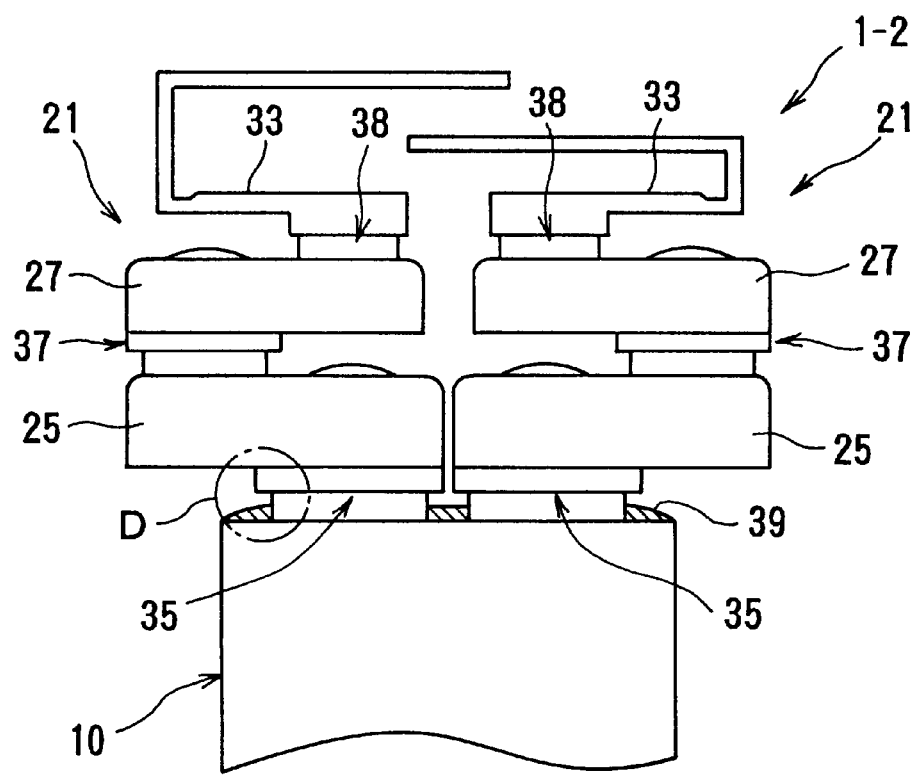
FIG. 4 is a fragmentary side elevational view of a workpiece transfer robot according to a second embodiment of the present invention.
Figure 5:
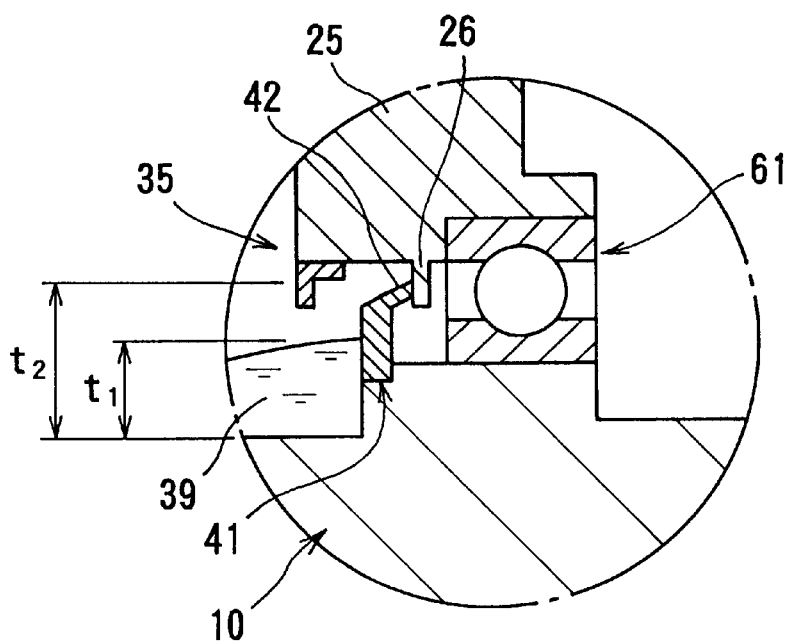
FIG. 5 is an enlarged fragmentary cross-sectional view of an encircled portion D in FIG. 4.

FIGS. 4 and 5 show a workpiece transfer robot which incorporates a liquid-tight mechanism according to a second embodiment of the present invention which is designed to prevent liquid such as water from entering the interior of the joint even under a large pressure difference between the atmospheric pressure and the pressure in the arm.

As shown in FIG. 4, a workpiece transfer robot 1–2 comprises a substantially cylindrical robot body 10 and a pair of arm mechanisms 21 mounted on an upper surface of the robot body 10. Each of the arm mechanisms 21 comprises two articulated arms 25, 27. The arm 25 is operatively connected to the robot body 10 by a joint 35 and the arm 27 is operatively connected to the arm 25 by a joint 37. A pair of vacuum chuck mechanisms 33 for holding semiconductor wafers under vacuum is operatively connected to the respective arms 27 by joints 38.

FIG. 5 shows an encircled portion D in FIG. 4 in enlarged cross section.

As shown in FIG. 5, the joint 35 includes a bearing mechanism 61 disposed between the robot body 10 and the arm 25 for supporting the arm 25 rotatably on the robot body 10. An oilless sliding dry seal 41 is disposed around the bearing mechanism 61 and mounted on the robot body 10. The oilless sliding dry seal 41 has an axial upper end which is tapered to form an annular sliding lip 42 having a smaller inner diameter. The oilless sliding dry seal 41 has an axial lower end fixed to an upper surface of the robot body 10. The arm 25 has an annular sliding ridge 26 extending downward therefrom and arranged radially inwardly of the oilless sliding dry seal 41. The annular sliding lip 42 has a tip end held in intimate sliding contact with an outer circumferential surface of the annular sliding ridge 26, thereby providing a secure seal between the annular sliding lip 42 and the annular sliding ridge 26.

The oilless sliding dry seal 41 may be incorporated in each of the joints 37, 38.

According to the second embodiment shown in FIGS. 4 and 5, the seal provided by the annular sliding lip 42 and the annular sliding ridge 26, i.e., the area where the annular sliding lip 42 and the annular sliding ridge 26 are held in sliding contact with each other, is provided at a position higher than the highest surface level which can be reached by the water 39 deposited in the largest quantity on the upper surface of the robot body 10 due to the surface tension on the upper surface of the robot body 10.

Specifically, if the highest surface level which can be reached by the deposited water 39 from the upper surface of the robot body 10 is t1=5 mm, then the height of the seal provided by the annular sliding lip 42 and the annular sliding ridge 26 from the upper surface of the robot body 10 is t2=8 mm.

With this arrangement, even when the water 39 is deposited in the largest quantity on the upper surface of the robot body 10, the water 39 is prevented from reaching the sealing part between the annular sliding lip 42 and the annular sliding ridge 26. Consequently, even if vacuum is developed in the arm 25 due to a leakage from the vacuum path in the workpiece transfer robot 1, no water will enter the interior of the joint 35 through the seal.

In each of the joints 37, 38, the similar seal is provided at a position higher than the highest surface level which can be reached by the water 39 deposited in the largest quantity due to the surface tension on each of the upper surfaces of the arms 25, 27.

In the second embodiment, although the seal comprises the oilless sliding dry seal as in the first embodiment, the seal may be of any of various other seal mechanisms such as an O-ring or a metal seal.

In the second embodiment, although the oilless sliding dry seal is applied to the workpiece transfer robot with the vacuum chuck, it is applicable to various types of workpiece transfer robots.

Figure 6:
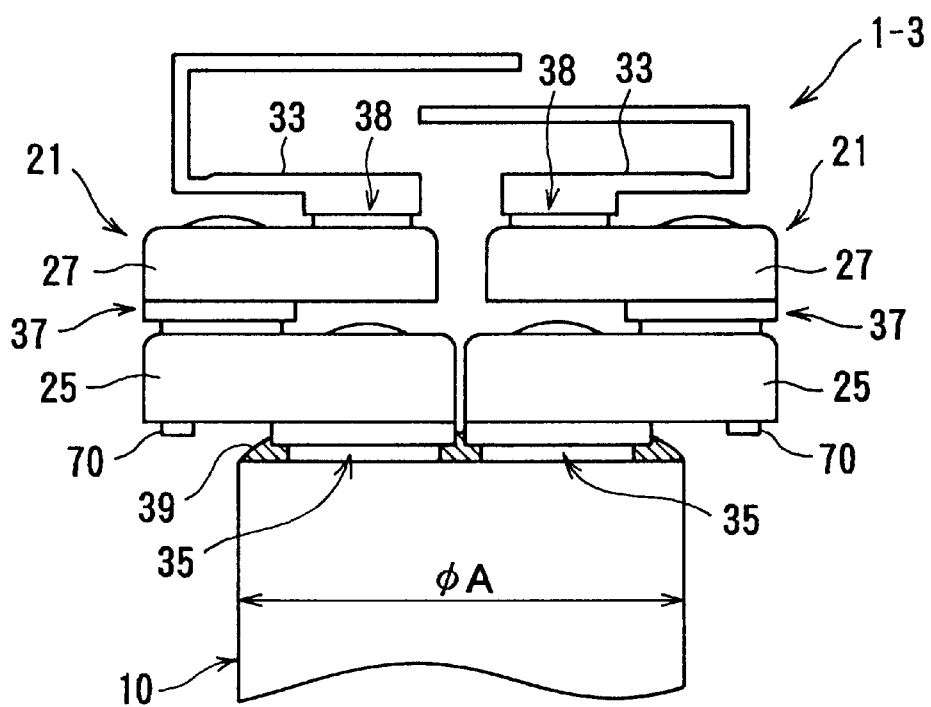
FIG. 6 is a fragmentary side elevational view of a workpiece transfer robot according to a third embodiment of the present invention.
Figure 7:
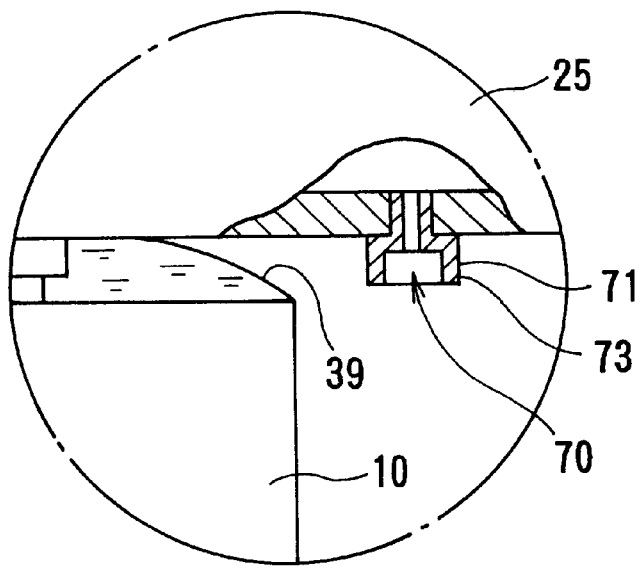
FIG. 7 is an enlarged fragmentary cross-sectional view of a portion having a vent hole of the workpiece transfer robot shown in FIG. 6.

FIGS. 6 and 7 show a workpiece transfer robot which incorporates a liquid-tight mechanism according to a third embodiment of the present invention.

As shown in FIG. 6, a workpiece transfer robot 1–3 comprises a substantially cylindrical robot body 10 having an outer diameter of ΦA, and a pair of arm mechanisms 21 mounted on an upper surface of the robot body 10. Each of the arm mechanisms 21 comprises two articulated arms 25, 27. The arm 25 is operatively connected to the robot body 10 by a joint 35 and the arm 27 is operatively connected to the arm 25 by a joint 37. A pair of vacuum chuck mechanisms 33 for holding semiconductor wafers under vacuum is operatively connected to the respective arms 27 by joints 38.

Each of the joints 35, 37, 38 has a seal mechanism that is identical to the seal mechanism shown in FIG. 3.

According to the third embodiment, a vent hole 70 is formed in a lower surface of each of the arms 25 at a position where the vent hole 70 does not face the upper surface of the robot body 10, i.e., at a position outside of the outer diameter 4A of the robot body 10, so that the vent hole 70 is away from the water 39 deposited on the upper surface of the robot body 10.

As shown in FIG. 7, the vent hole 70 is defined by a tubular member 71 that is mounted on and extends through the lower surface of the arm 25, thereby providing communication between the interior of the arm 25 and the exterior of the arm 25.

The tubular member 71 comprises two portions having respective different outer diameters and joined to each other at a substantially central region thereof. The smaller-diameter portion of the tubular member 71 is inserted in the arm 25, whereas the larger-diameter portion of the tubular member 71 projects downwardly from the arm 25 and includes an annular cylinder of flange 73. The tubular member 71 may be integrally formed with the arm 25, and may have a single inner diameter.

The vent hole 70 operates as follows: When the workpiece transfer robot 1–3 operates to cause the vacuum chuck mechanism 33 to hold a semiconductor wafer under vacuum and to transfer the semiconductor wafer, pure water or the like attached to the semiconductor wafer drops and is deposited on the upper surface of the robot body 10 as water 39 thereon.

Since the interior of the arm 25 communicates with the exterior of the arm 25 through the vent hole 70, the pressure in the arm 25 is substantially the same as the atmospheric pressure, and no vacuum is developed in the arm 25 even if the vacuum path in the arm 25 suffers a leakage.

Thus, even when the water 39 on the upper surface of the robot body 10 increases in quantity to thus contact the joint 35, the water 39 will not be drawn into the interior of the joint 35. Therefore, the oilless sliding dry seal 41 in the joint 35 is sufficiently effective in preventing the water 39 from entering the interior of the joint 35.

Inasmuch as the vent hole 70 is positioned out of reach of the water 39, the water 39 will not be drawl into the vent hole 70 when air is introduced through the vent Dole 70 into the arm 25.

Even if the water 39 reaches the vest hole 70 along the lower surface of the arm 25, it is prevented from entering the interior of the arm 25 by the flange 73 that projects downwardly from the lower surface of the arm 25.

A vent hole may be defined in each of the arms 25, 27 to prevent water deposited on the upper surface of the arm 25 from entering the interior of the arm 27 through the joint 37.

In each of the above embodiments, the number of arms and joints mounted on the robot body is nit limited to the illustrated number, but may be one or more.

In the above embodiments, the liquid-tight mechanism is incorporated in a workpiece transfer robot with a vacuum chuck for transferring semiconductor wafers. However, the principles of the present invention are also applicable to other types of workpiece transfer robots.

As described above, the present invention offers the following advantages:

Even if the workpiece transfer robot is installed in the cleaning section of the polishing apparatus and various liquid is applied to the workpiece transfer robot, since liquid is prevented from entering the interior of the arm or the interior of the robot body, the interior of the arm or the internal mechanisms of the robot is protected from corrosion. Consequently, the workpiece transfer robot is required to be serviced less frequently, has a longer service life, and contributes to a higher production rate for the polished semiconductor devices, than the conventional workpiece transfer robot which is not equipped with the sealing mechanism.

Since the oilless sliding dry seal has a smaller sliding resistance compared with an O-ring, an electric motor may be of smaller output power requirements, and may be an energy saver, less costly, and small in size.

Further, the second and third aspects of the present invention are effective in reliably preventing liquid from entering the interior of the workpiece transfer robot even when the vacuum path in the workpiece transfer robot suffers a leakage to develop vacuum in the interior of the robot.

Although certain preferred embodiments of the present invention have been shown and described in detail, it should be understood that various changes and modifications may be made therein without departing from the scope of the appended claims.

What is claimed is:

1. A polishing apparatus comprising:
    a polishing section including a top ring for holding a workpiece to be polished and a turntable having a polishing surface for polishing a surface of the workpiece held by said top ring;
    a cleaning section including a cleaning device for cleaning the workpiece that has been polished in said polishing section; and
    a workpiece transfer robot for transferring the workpiece to be polished to said polishing section or for transferring the workpiece that has been polished to said cleaning section, said workpiece transfer robot comprising:
        a robot body;
        at least one arm operatively coupled to said robot body by at least one joint;
        a holder mechanism mounted on said arm for holding the workpiece; and
        a seal mechanism at said joint for preventing liquid from entering an interior of said joint, said seal mechanism comprising:
            a ring member having at a tip end thereof an annular sliding lip;
            said ring member being mounted on a first member comprising one of said robot body and said arm;
            a second member comprising the other of said robot body and said arm having an annular sliding ridge; and
            said annular sliding lip being in contact with said annular sliding ridge.

2. A polishing apparatus as claimed in claim 1, wherein said ring member is made of synthetic resin.

3. A polishing apparatus comprising:
    a polishing section including a top ring for holding a workpiece to be polished and a turntable having a polishing surface for polishing a surface of the workpiece held by said top ring;
    a cleaning section including a cleaning device for cleaning the workpiece that has been polished in said polishing section; and
    a workpiece transfer robot for transferring the workpiece to be polished to said polishing section or for transferring the workpiece that has been polished to said cleaning section, said workpiece transfer robot comprising:
        a robot body;
        at least one arm operatively coupled to said robot body by at least one joint;
        a holder mechanism mounted on said arm for holding he workpiece; and
        a seal mechanism at said joint for preventing liquid from entering an interior of said joint, a sealing area of said seal mechanism being located at a position higher than the highest surface level that can be attained by liquid that becomes deposited on-an upper surface of one of said robot body and said arm, said seal mechanism comprising:
            a ring member having at a tip end thereof an annular sliding lip;
            said ring member being mounted on a first member comprising one of said robot body and said arm;
            a second member comprising the other of said robot body and said arm having an annular sliding ridge; and
            said annular sliding lip being in contact with said annular sliding ridge at said sealing area.

4. A polishing apparatus as claimed in claim 3, wherein said ring member is made of synthetic resin.

5. A polishing apparatus comprising:
    a polishing section including a top ring for holding a workpiece to be polished and a turntable having a polishing surface for polishing a surface of the workpiece held by said top ring;
    a cleaning section including a cleaning device for cleaning the workpiece that has been polished in said polishing section; and
    a workpiece transfer robot for transferring the workpiece to be polished to said polishing section or for transferring the workpiece that has been polished to said cleaning section, said workpiece transfer robot comprising:
        a robot body;
        at least one arm operatively coupled to said robot body by at least one joint;
        a vacuum chuck mechanism mounted on said arm for holding the workpiece under vacuum;
        a vacuum path extending from said robot body through said joint and said arm to said vacuum chuck mechanism;
        a seal mechanism at said joint for preventing liquid from entering an interior of said joint;
        a vent hole in said arm for substantially equalizing a pressure within said arm to a pressure existing outside of said arm.

6. A polishing apparatus as claimed in claim 5, wherein said seal mechanism comprises an oilless sliding seal.

7. A polishing apparatus as claimed in claim 6 wherein said oilless sliding seal comprises a ring member made of synthetic resin and having at a tip end thereof an annular sliding lip, said ring member being mounted on a first member comprising one of said robot body and said arm, a second member comprising the other of said robot body and said arm having an annular sliding ridge, and said annular sliding lip being in contact with said annular sliding ridge.

8. A polishing apparatus as claimed in claim 5, wherein said vent hole is located at a position outwardly of an outer diameter of said robot body.

* * * * *

UNITED STATES PATENT AND TRADEMARK OFFICE
CERTIFICATE OF CORRECTION

PATENT NO. : 6,110,024
DATED : August 29, 2000
INVENTOR(S) : Tetsuji TOGAWA

It is certified that error appears in the above-identified patent and that said Letters Patent is hereby corrected as shown below:

Column 10, line 18, change "he" to --the--.

Signed and Sealed this

Twenty-ninth Day of May, 2001

Attest:

NICHOLAS P. GODICI

*Attesting Officer*          *Acting Director of the United States Patent and Trademark Office*

UNITED STATES PATENT AND TRADEMARK OFFICE
CERTIFICATE OF CORRECTION

PATENT NO. : 6,110,024
DATED : August 8, 2000
INVENTOR(S) : Hudson et al.

It is certified that error appears in the above-identified patent and that said Letters Patent is hereby corrected as shown below:

Column 15,
Line 20, delete "D-Gel®" and insert in its place -- D-Gel™ --.

Column 16,
Line 67, delete "DATP," and insert in its place -- dATP, --.

Column 17,
Line 22, delete "containedrespectively" and insert in its place -- contained respectively --.

Column 21,
Line 54, delete "taraet" and insert in its place -- target --.

Column 24, claim 15,
Line 54, "hage" andinsert in its place -- phage --.

Signed and Sealed this

Eighteenth Day of December, 2001

Attest:

JAMES E. ROGAN
Attesting Officer     Director of the United States Patent and Trademark Office

UNITED STATES PATENT AND TRADEMARK OFFICE
CERTIFICATE OF CORRECTION

PATENT NO.    : 6,110,024
DATED         : August 8, 2000
INVENTOR(S)   : Hudson et al.

It is certified that error appears in the above-identified patent and that said Letters Patent is hereby corrected as shown below:

This certificate supersedes Certificate of Correction issued December 18, 2001, since the patent number was erroneously mentioned and no Certificate of Correction was granted, the certificate should be deleted.

Signed and Sealed this

Second Day of July, 2002

Attest:

Attesting Officer

JAMES E. ROGAN
*Director of the United States Patent and Trademark Office*